(12) United States Patent
Alexopoulos et al.

(10) Patent No.: US 9,407,338 B2
(45) Date of Patent: Aug. 2, 2016

(54) ANTENNA ARRAY STRUCTURE WITH DIFFERING ANTENNAS (71) Applicant: BROADCOM CORPORATION, Irvine, CA (US)

(72) Inventors: Nicolaos Georgiou Alexopoulos, Irvine, CA (US); Seunghwan Yoon, Irvine, CA (US); Alfred Grau Besoli, Barcelona (ES)

(73) Assignee: BROADCOM CORPORATION, Irvine, CA (US)

( * ) Notice: Subject to any disclaimer, the term of this patent is extended or adjusted under 35 U.S.C. 154(b) by 231 days.

(21) Appl. No.: 14/042,394

(22) Filed: Sep. 30, 2013

(65) Prior Publication Data
US 2015/0070229 A1 Mar. 12, 2015

Related U.S. Application Data (60) Provisional application No. 61/876,456, filed on Sep. 11, 2013.

(51) Int. Cl.
H01Q 21/30 (2006.01)
H04B 7/04 (2006.01)
H01Q 1/36 (2006.01)
H01Q 21/28 (2006.01)
H04B 7/06 (2006.01)
H04B 7/08 (2006.01)

(52) U.S. Cl.
CPC .............. H04B 7/0413 (2013.01); H01Q 1/36 (2013.01); H01Q 21/28 (2013.01); H04B 7/06 (2013.01); H04B 7/08 (2013.01)

(58) Field of Classification Search
CPC ......... H01Q 1/36; H01Q 21/28; H01Q 21/30; H01Q 25/00
USPC .......................................... 343/745, 893, 895
See application file for complete search history.

(56) References Cited

U.S. PATENT DOCUMENTS 6,166,694 A * 12/2000 Ying .............................. 343/702
8,965,276 B2 * 2/2015 Bongfeldt ............ H01Q 1/1242
343/878

* cited by examiner

Primary Examiner — Hoang V Nguyen
(74) Attorney, Agent, or Firm — Garlik & Markison; Bruce E. Garlick

(57) ABSTRACT

An antenna array structure includes a plurality of antennas, wherein a first antenna has a first geometric shape, provides a first radiation pattern, and has a first frequency bandwidth. A second antenna has a second geometric shape to provide a second radiation pattern and has a second frequency bandwidth. The first and second frequency bandwidths at least partially overlap to include channels of interest. An antenna processing circuit sends one or more transmit signals to one or more of the antennas for transmission via one or more of the channels of interest and receives one or more receive signals from the one or more of the antennas or from another one or more of the antennas via the one or more of the channels of interest or from another one or more of the channels of interest.

20 Claims, 10 Drawing Sheets

FIG. 4K
square spiral

ANTENNA ARRAY STRUCTURE WITH DIFFERING ANTENNAS

CROSS REFERENCE TO RELATED PATENTS

The present U.S. Utility patent application claims priority pursuant to 35 U.S.C. §119(e) to the following U.S. Provisional patent application which is hereby incorporated herein by reference in its entirety and made part of the present U.S. Utility patent application for all purposes:

1. U.S. Provisional Application Ser. No. 61/876,456, entitled "ANTENNA ARRAY STRUCTURE WITH DIFFERING ANTENNAS," filed Sep. 11, 2013, pending.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND

1. Technical Field

This invention relates generally to wireless communication systems and more particularly to antenna structures used in such wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks to radio frequency identification (RFID) systems to radio frequency radar systems. Each type of communication system is constructed, and hence operates, in accordance with one or more communication standards. For instance, radio frequency (RF) wireless communication systems may operate in accordance with one or more standards including, but not limited to, RFID, IEEE 802.11, Bluetooth, global system for mobile communications (GSM), code division multiple access (CDMA), WCDMA, local multi-point distribution systems (LMDS), multi-channel-multi-point distribution systems (MMDS), LTE, WiMAX, and/or variations thereof. As another example, infrared (IR) communication systems may operate in accordance with one or more standards including, but not limited to, IrDA (Infrared Data Association).

For an RF wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). The receiver is coupled to the antenna and includes a low noise amplifier, one or more intermediate frequency stages, a filtering stage, and a data recovery stage. The transmitter includes a data modulation stage, one or more intermediate frequency stages, and a power amplifier, which is coupled to the antenna.

Since a wireless communication begins and ends with the antenna, a properly designed antenna structure is an important component of wireless communication devices. As is known, the antenna structure is designed to have a desired impedance (e.g., 50 Ohms) at an operating frequency, a desired bandwidth centered at the desired operating frequency, and a desired length (e.g., ¼ wavelength of the operating frequency for a monopole antenna). As is further known, the antenna structure may include a single monopole or dipole antenna, a diversity antenna structure, an antenna array having the same polarization, an antenna array having different polarization, and/or any number of other electromagnetic properties.

Two-dimensional antennas are known to include a meandering pattern or a micro strip configuration. For efficient antenna operation, the length of an antenna should be ¼ wavelength for a monopole antenna and ½ wavelength for a dipole antenna, where the wavelength $(\lambda)=c/f$, where c is the speed of light and f is frequency. For example, a ¼ wavelength antenna at 900 MHz has a total length of approximately 8.3 centimeters (i.e., $0.25*(3\times10^8 \text{ m/s})/(900\times10^6 \text{ c/s})=0.25*33$ cm, where m/s is meters per second and c/s is cycles per second). As another example, a ¼ wavelength antenna at 2400 MHz has a total length of approximately 3.1 cm (i.e., $0.25*(3\times10^8 \text{ m/s})/(2.4\times10^9 \text{ c/s})=0.25*12.5$ cm).

While two-dimensional antennas provide reasonable antenna performance for many wireless communication devices, there are issues when the wireless communication devices require full duplex operation and/or multiple input and/or multiple output (e.g., single input multiple output, multiple input multiple output, multiple input single output) operation. For instance, multiple input multiple output (MIMO) antenna structures use antennas with the same radiation pattern and bandwidth.

DETAILED DESCRIPTION

Figure 1:
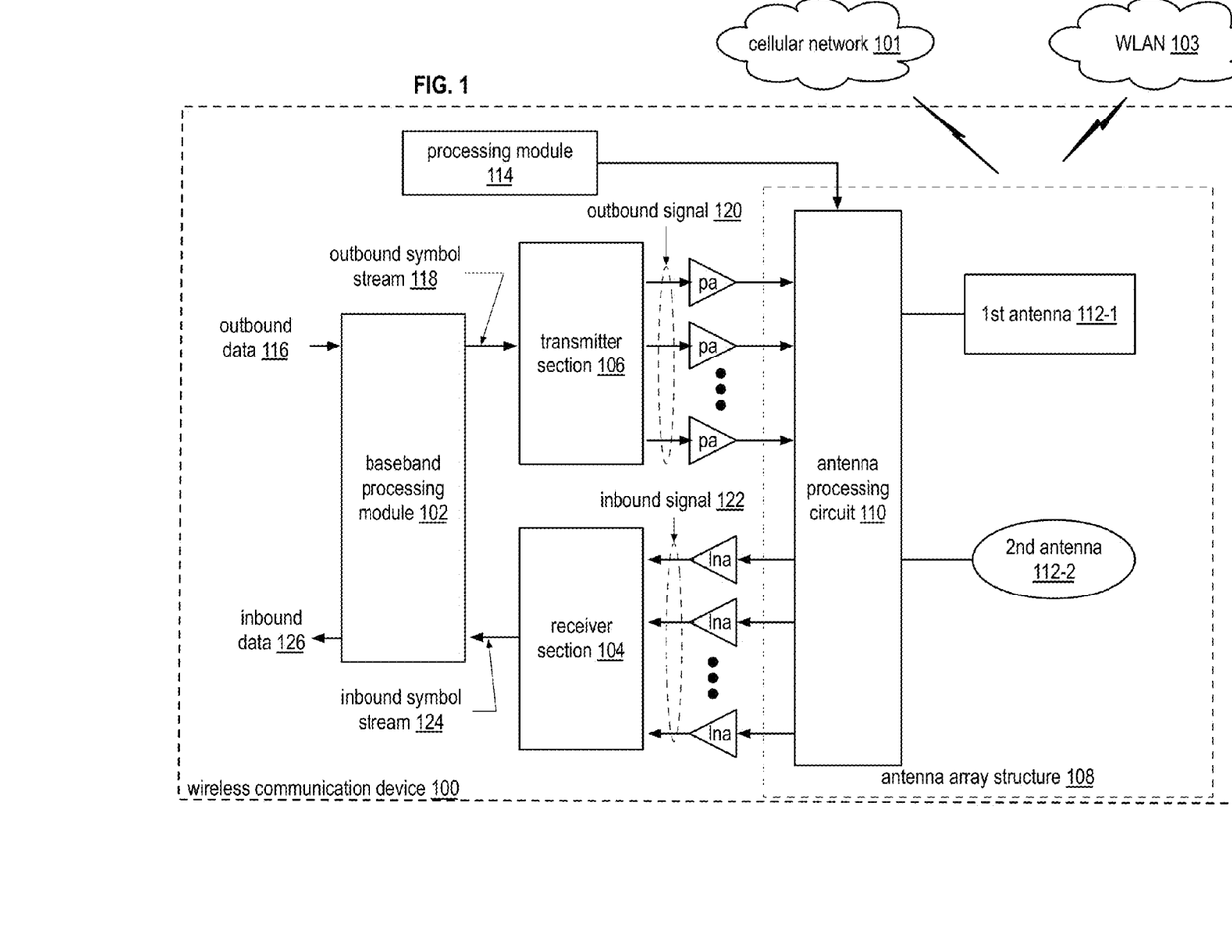
FIG. 1 is a schematic block diagram of an embodiment of a wireless communication device in accordance with the present disclosure.

FIG. 1 is a schematic block diagram of an embodiment of a wireless communication device 100 that may be any device that can be carried by a person, can be at least partially powered by a battery, includes a radio transceiver (e.g., radio frequency (RF) and/or millimeter wave (MMW)) and performs one or more software applications. For example, the wireless communication device 100 may be a cellular telephone, a laptop computer, a personal digital assistant, a video game console, a video game player, a personal entertainment unit, a tablet computer, etc. The wireless communication device 100 may communicate via the cellular network 101 and/or the wireless local area network (WLAN) network 103 in accordance with one or more cellular and/or WLAN protocols.

The wireless communication device 100 includes a baseband processing module 102, a receiver section 104, a plurality of low noise amplifiers, a transmitter section 106, a plurality of power amplifiers, a processing module 114, and an antenna array structure 108. The antenna array structure 108 includes an antenna processing circuit 110, and one or more antennas (e.g. a first antenna 112-1 and a second antenna 112-2). The first antenna 112-1 has a first shape to provide a first radiation pattern and first frequency bandwidth. The second antenna 112-2 has a second shape to provide a second radiation pattern and second frequency bandwidth. The first and second radiation patterns have a specific direction and a linear and/or a circular polarization. The first antenna's bandwidth and the second antenna's bandwidth at least partially overlap channels of interest (e.g., carrier frequencies of one or more wireless communication protocols).

In an example of transmitting an outbound signal 120, the baseband processing module 102 converts outbound data 116 (e.g., voice, text, video, graphics, video file, audio file, etc.) into a outbound symbol stream 118 in accordance with one or more wireless communication standards (e.g., GSM, CDMA, WCDMA, HSUPA, HSDPA, WiMAX, EDGE, GPRS, IEEE 802.11, Bluetooth, ZigBee, universal mobile telecommunications system (UMTS), long term evolution (LTE), IEEE 802.16, evolution data optimized (EV-DO), etc.). Such a conversion includes one or more of: scrambling, puncturing, encoding, interleaving, constellation mapping, modulation, frequency spreading, frequency hopping, beamforming, space-time-block encoding, space-frequency-block encoding, frequency to time domain conversion, and/or digital baseband to intermediate frequency conversion. Note that the baseband processing module 102 converts the outbound data 116 into a single outbound symbol stream 118 for Single Input Single Output (SISO) communications and/or for Multiple Input Single Output (MISO) communications and converts the outbound data 116 into multiple outbound symbol streams 188 for Single Input Multiple Output (SIMO) and Multiple Input Multiple Output (MIMO) communications.

The transmitter section 106 converts the outbound symbol stream 118 into one or more outbound signals 120. The power amplifiers amplify the one or more outbound signals 120 (e.g., signals in one or more frequency bands 800 MHz, 1800 MHz, 1900 MHz, 2000 MHz, 2.4 GHz, 5 GHz, 60 GHz, etc.). The antenna processing circuit 110 receives the one or more outbound signals 120 and couples them to the antennas in a variety of ways based on various operational modes. For instance, the antenna processing circuit 110 is able to couple for multiple input multiple output (MIMO) operation, diversity antenna operation, and/or both MIMO and diversity antenna operations. The antenna processing circuit 110 sends the one or more outbound signals 120 to the first and second antennas 112-1 through 112-2 for transmission via one or more channels of interest.

In an example of receiving an inbound signal 122, the first and second antennas 112-1 through 112-2 receive the one or more inbound signals 122 and provides them to the antenna processing circuit 110. The antenna processing circuit 110 couples the signals to the low noise amplifiers in a variety of ways based on various operational modes. The low noise amplifiers amplify the one or more inbound signals 122 and provide them to the receiver section 104. The receiver section 104 converts the one or more inbound signals 122 into one or more inbound symbol streams 124.

The baseband processing module 102 converts the inbound symbol stream(s) 124 into inbound data 126 (e.g., voice, text, audio, video, graphics, etc.) in accordance with one or more wireless communication standards. Such a conversion may include one or more of: digital intermediate frequency to baseband conversion, time to frequency domain conversion, space-time-block decoding, space-frequency-block decoding, demodulation, frequency spread decoding, frequency hopping decoding, beamforming decoding, constellation demapping, deinterleaving, decoding, depuncturing, and/or descrambling. Note that the baseband processing module 102 converts a single inbound symbol stream 124 into the inbound data 126 for Single Input Single Output (SISO) communications and/or for Multiple Input Single Output (MISO) communications and converts multiple inbound symbol streams 124 into the inbound data 126 for Single Input Multiple Output (SIMO) and Multiple Input Multiple Output (MIMO) communications.

The wireless communication device 100 may be implemented using one or more integrated circuits (IC) and one or more substrates (e.g., printed circuit boards), where an IC includes one or more IC dies and an IC package substrate. For example, the antenna processing circuit 110, the power amplifiers, and the low noise amplifiers may be implemented on the one or more IC dies and the antennas 112-1, etc., on an IC package substrate and/or one of the substrates. As another example, one or more of the baseband processing module 102, the receiver section 104, the transmitter section 106, and the processing module 114 may also be implemented on the one or more IC dies.

Figure 2:
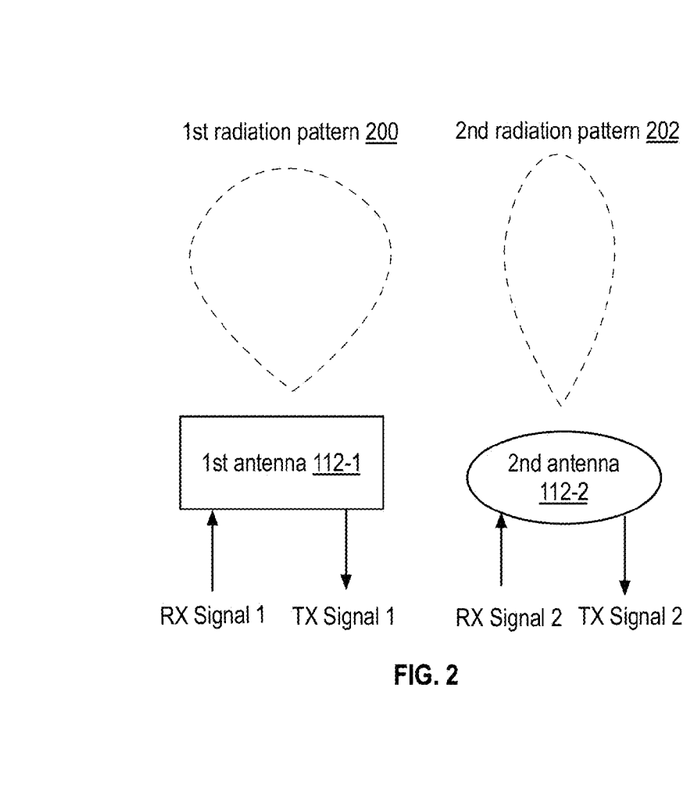
FIG. 2 is a diagram of an embodiment of a first antenna and a second antenna of a wireless communication device in accordance with the present disclosure.

FIG. 2 is a diagram of an embodiment of a first antenna 112-1 and a second antenna 112-2 of a wireless communication device. The first antenna 112-1 has a first geometric shape and produces a first radiation pattern 200 and the second antenna 112-2 has a second geometric shape and produces a second radiation pattern 202. The first antenna 112-1 and the second antenna 112-2 differ in shape so the first and second radiation patterns 200-202 are different. Depending on the differences in the antennas' shapes, the radiation patterns can also differ in direction, polarization, etc.

As shown, the first antenna 112-1 has a shorter, wider radiation pattern than that of the second antenna 112-2. When the first antenna 112-1 and the second antenna 112-2 are used in the same antenna array structure, their respective radiation patterns combine in air to provide a broader, more diverse radiation pattern than achieved separately. Combining the first and second radiation patterns 200-202 creates a taller radiation pattern than achieved with the first antenna 112-1 alone and a wider radiation pattern than achieved by using the second antenna 112-2 alone therefore improving the diversity and capacity of the antenna array structure in comparison to an antenna array that includes similarly shaped antennas.

Figure 3:
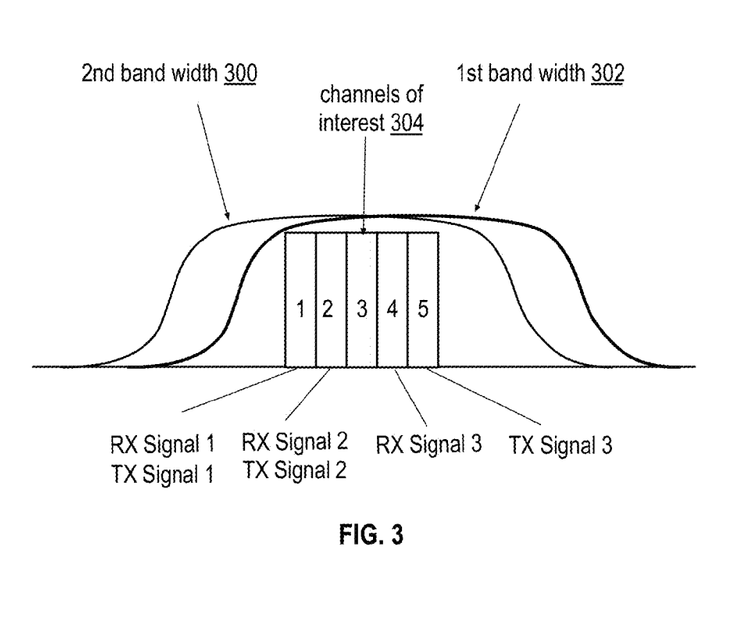
FIG. 3 is a diagram of an example of a first bandwidth and a second bandwidth of the first antenna and the second antenna in accordance with the present disclosure.

FIG. 3 is a diagram of an example of a first bandwidth 302 and a second bandwidth 300 of the first antenna 112-1 and the second antenna 112-2 that substantially overlap channels of interest 304. If the first and second bandwidths 302-300 differ, they have a substantial enough overlap to include channels of interest 304 for proper operation. Channels of interest 304 may be in one or more of a plurality of frequency bands, such as 850 MHz and 1900 MHz for cellular communication, 2.4 GHz, 3.6 GHz, 5 GHz, and 60 GHz for WLAN communications and/or personal area network communications. In general, the resonant frequencies of the first and second antennas 112-1-112-2 should be proximal to the center frequency of the channel of interest's frequency band, but may be offset from the center frequency to provide a more diverse antenna array.

In an example of operation, the antennas are configured to support three concurrent or time duplexed communications via the channels of interest. A first communication (RX and TX signal 1) is conveyed over a first channel, a second communication (RX and TX signal 2) is conveyed over a second channel, and a third communication has transmit signals (TX signal 3) conveyed over channel 5 and receive signals (RX signal 3) conveyed over channel 4. The communications may be separate communications and/or communications of a MIMO communication.

Figure 4A:
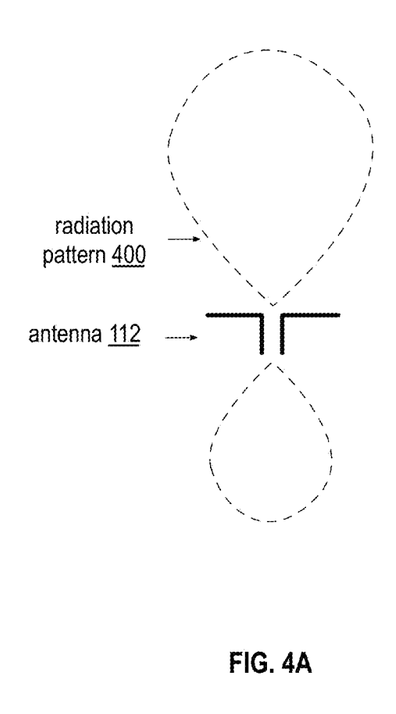
FIGS. 4A-4M illustrate various embodiments of antennas that may be used as the first and/or second antenna in accordance with the present disclosure.
Figure 4B:
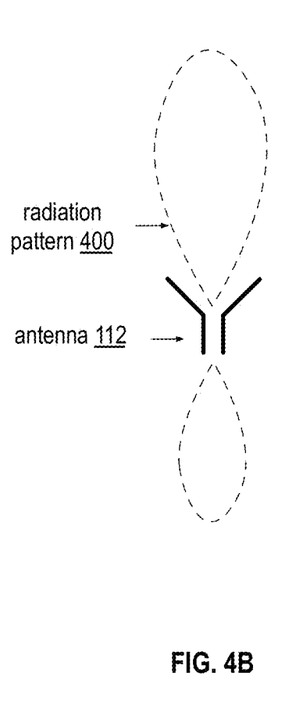
Figure 4C:
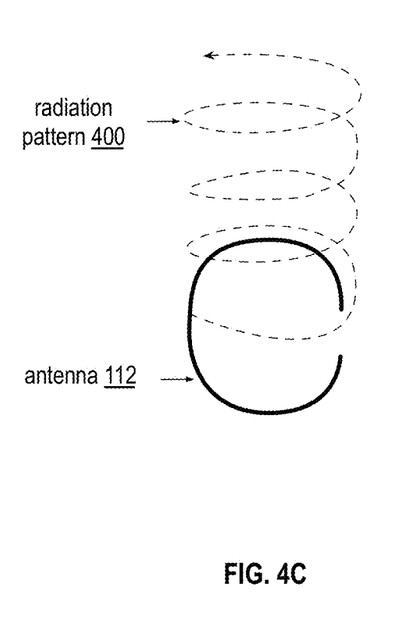

FIGS. 4A-4M illustrate various embodiments of antennas that may be used as the first and/or second antenna of the antenna array structure. FIG. 4A illustrates a dipole antenna 112 with a 90° angle. The dipole antenna creates a radiation pattern 400 with a linear polarization, one lobe in the upward direction, and another lobe in the downward direction. FIG. 4B illustrates a dipole antenna 112 with a 45° angle. The dipole antenna with a 45° angle creates a similar radiation pattern to the dipole antenna with a 90° angle, but may be narrower and taller. FIG. 4C illustrates a circular antenna 112. The circular antenna 112 creates a radiation pattern 400 with an upward direction and a circular polarization (e.g., left or right handed depending on polarity of the source feeding the antenna).

Figure 4D:
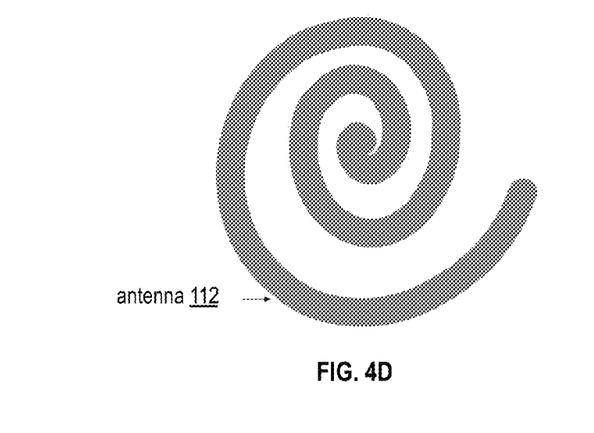
Figure 4E:
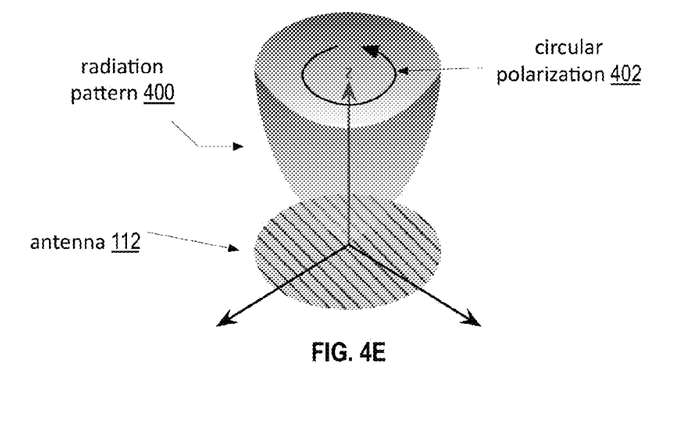
Figure 4F:
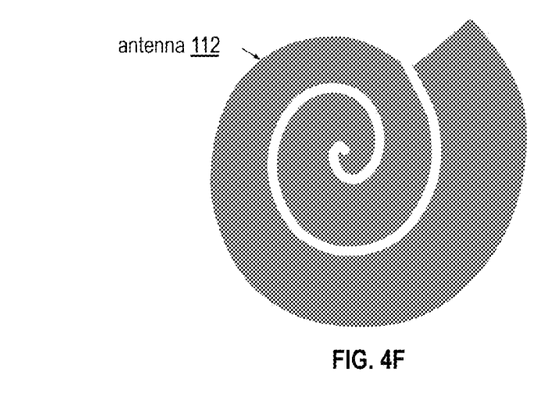
Figure 4G:
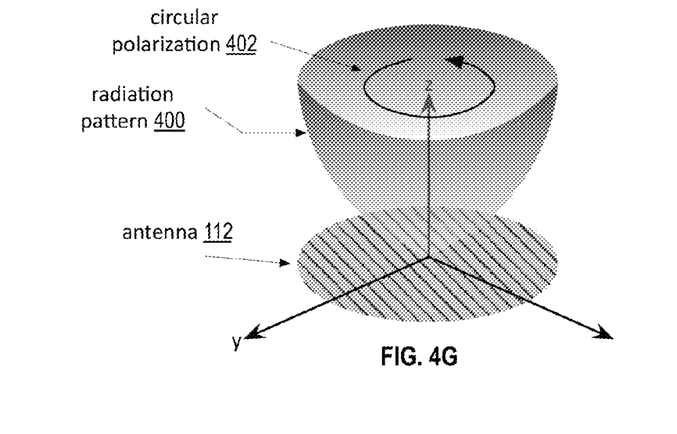

FIG. 4D illustrates a spiral trace antenna 112. The spiral trace antenna 112 creates a radiation pattern 400 with a circular polarization 402 in the z direction as shown in FIG. 4E. FIG. 4F illustrates a spiral etch antenna 112. As shown in FIG. 4G, the spiral etch antenna 112 creates a radiation pattern 400 with a circular polarization 402 in the z direction similar to that of FIG. 4E.

Figure 4H:
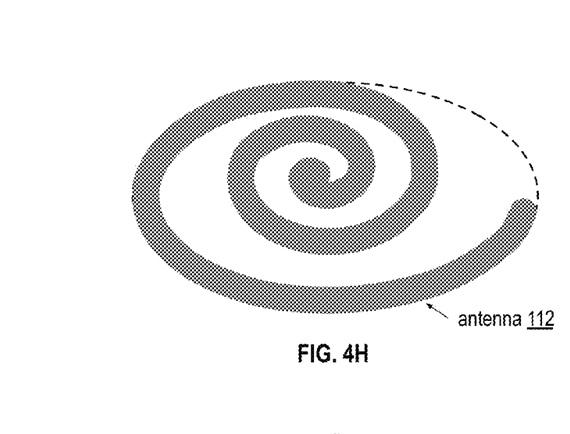
Figure 4I:
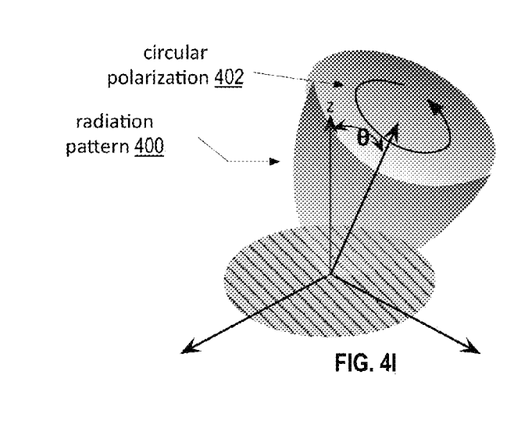
Figure 4J:
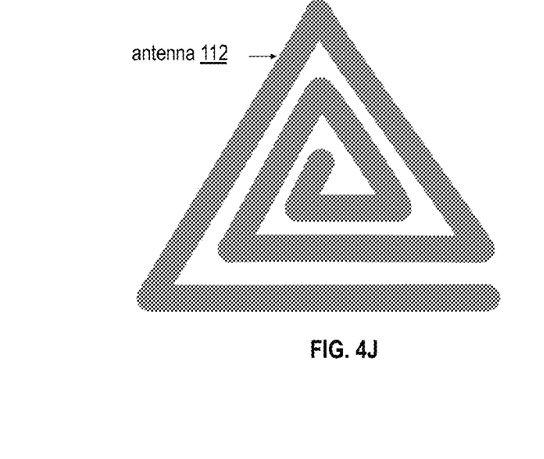
Figure 4K:
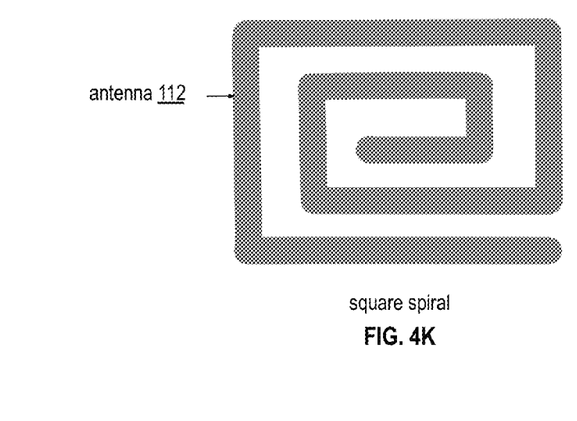

FIG. 4H illustrates an eccentric spiral antenna 112. The eccentric spiral antenna 112 creates a radiation pattern 400 with a circular polarization 402 that is offset by an angle theta from the z-axis as shown in FIG. 4I. FIG. 4J illustrates a triangular spiral antenna 112. A triangular spiral antenna 112 would produce a relatively triangular shaped radiation pattern with circular polarization perpendicular to the surface of the antenna. FIG. 4K illustrates a square spiral antenna 112. A square spiral antenna 112 produces a relatively square shaped radiation pattern with circular polarization perpendicular to the surface of the antenna. If the triangle and/or square spiral antennas are asymmetric (e.g. the square spiral is a rectangular spiral) the radiation pattern would tilt by an angle from the axis normal to the plane of the antenna.

Figure 4L:
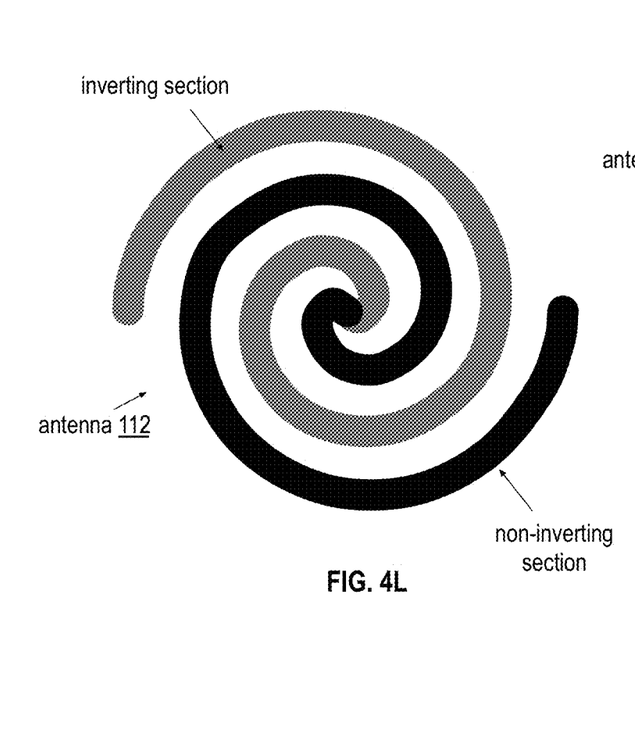
Figure 4M:
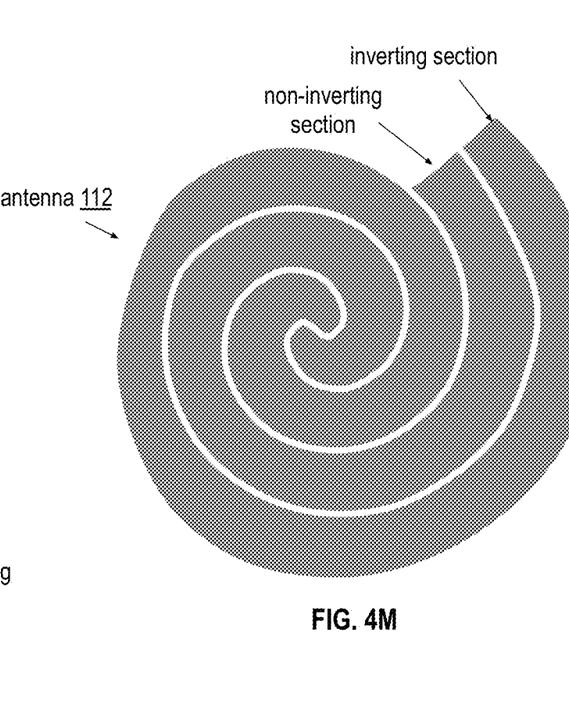

FIG. 4L illustrates an interwoven trace spiral antenna 112. The interwoven trace spiral antenna 112 includes an inverting section and a non-inverting section. The connection of the two spiral sections creates an excitation point at the center of the antenna. The interwoven trace spiral antenna 112 has a radiation pattern with circular polarization perpendicular to the surface of the antenna. The spiral sections increase the gain of the radiation pattern. As an example, the inverting and non-inverting sections form a Celtic spiral, an Archimedes' spiral, or the like. FIG. 4M illustrates an interwoven etch spiral antenna 112. Like the interwoven trace spiral antenna 112, the interwoven etch spiral antenna 112 includes an inverting section, a non-inverting section, and an excitation point at the spiral connection. The interwoven etch spiral antenna 112 creates a radiation pattern with circular polarization perpendicular to the surface of the antenna. The spiral sections increase the gain of the radiation pattern.

Figure 5A:
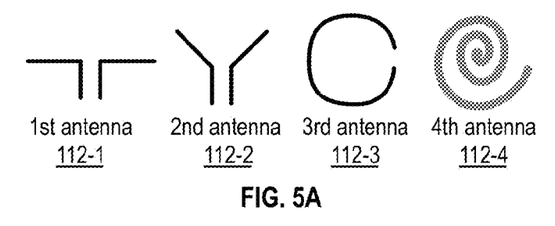
FIG. 5A illustrates an embodiment of an antenna array structure that includes antennas of different shapes in accordance with the present disclosure.

FIG. 5A illustrates an embodiment of the antenna array structure that includes antennas of different shapes. The antenna array structure includes a first antenna 112-1, second antenna 112-2, third antenna 112-3, and fourth antenna 112-4, but could include more than four antennas. The first antenna 112-1 is a dipole antenna with a 90° angle, the second antenna 112-2 is a dipole antenna with a 45° angle, the third antenna 112-3 is a circular antenna, and the fourth antenna 112-4 is a spiral antenna. As discussed in the previous figures, each of these antennas has a unique radiation pattern. The antenna shape diversity creates a more diverse radiation pattern for the antenna array structure.

Figure 5B:
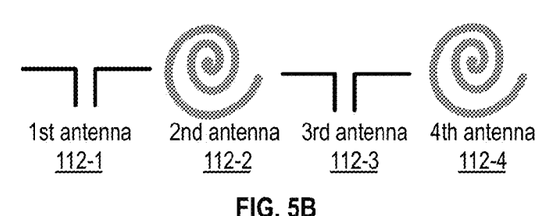
FIG. 5B illustrates another embodiment of an antenna array structure that includes antennas of similar and different shapes in accordance with the present disclosure.

FIG. 5B illustrates another embodiment of the antenna array structure that includes antennas of similar and different shapes. The antenna array structure includes a first antenna 112-1, second antenna 112-2, third antenna 112-3, and fourth antenna 112-4, but could include more than four antennas. The first antenna 112-1 and third antenna 112-3 are 90° angle dipole antennas. The second antenna 112-2 and fourth antenna 112-4 are spiral antennas. The individual shape of the antennas in the antenna array structure can be similar to or different to those of other antennas based on the desired combined radiation pattern of the antenna array structure.

Figure 6:
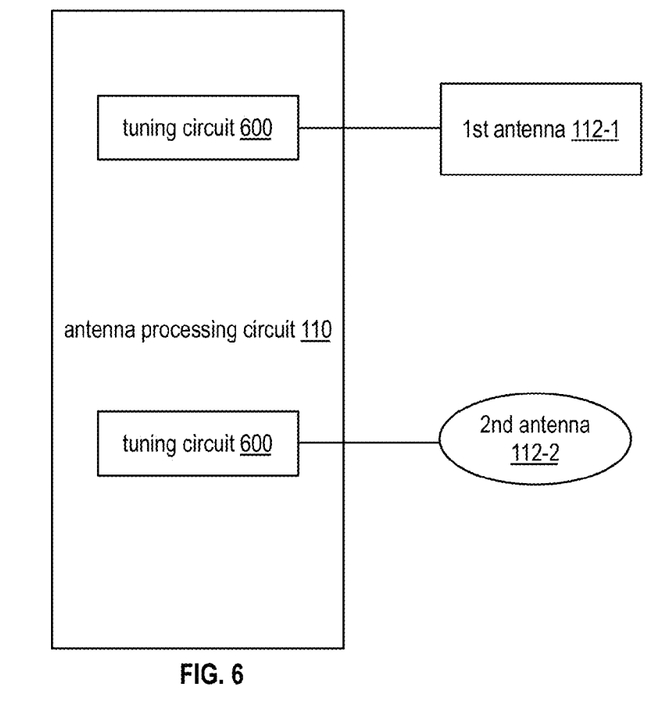
FIG. 6 is a schematic block diagram of an embodiment of an antenna processing circuit of a wireless communication device in accordance with the present disclosure.

FIG. 6 is a schematic block diagram of an embodiment of an antenna processing circuit 110 of a wireless communication device. The antenna processing circuit 110 includes tuning circuits 600 to adjust properties of the first antenna 112-1 and the second antenna 112-2. For instance, the first and second antenna tuning circuits 600 adjust the shape and/or direction of the first and second antennas' radiation patterns to achieve a desired combined radiation pattern. The antenna tuning circuit 600 may include phase shifting circuitry for adjusting the direction of a radiation pattern, impedance matching circuitry, and/or an artificial magnetic conductor to adjust the shape of the radiation pattern.

Figure 7:
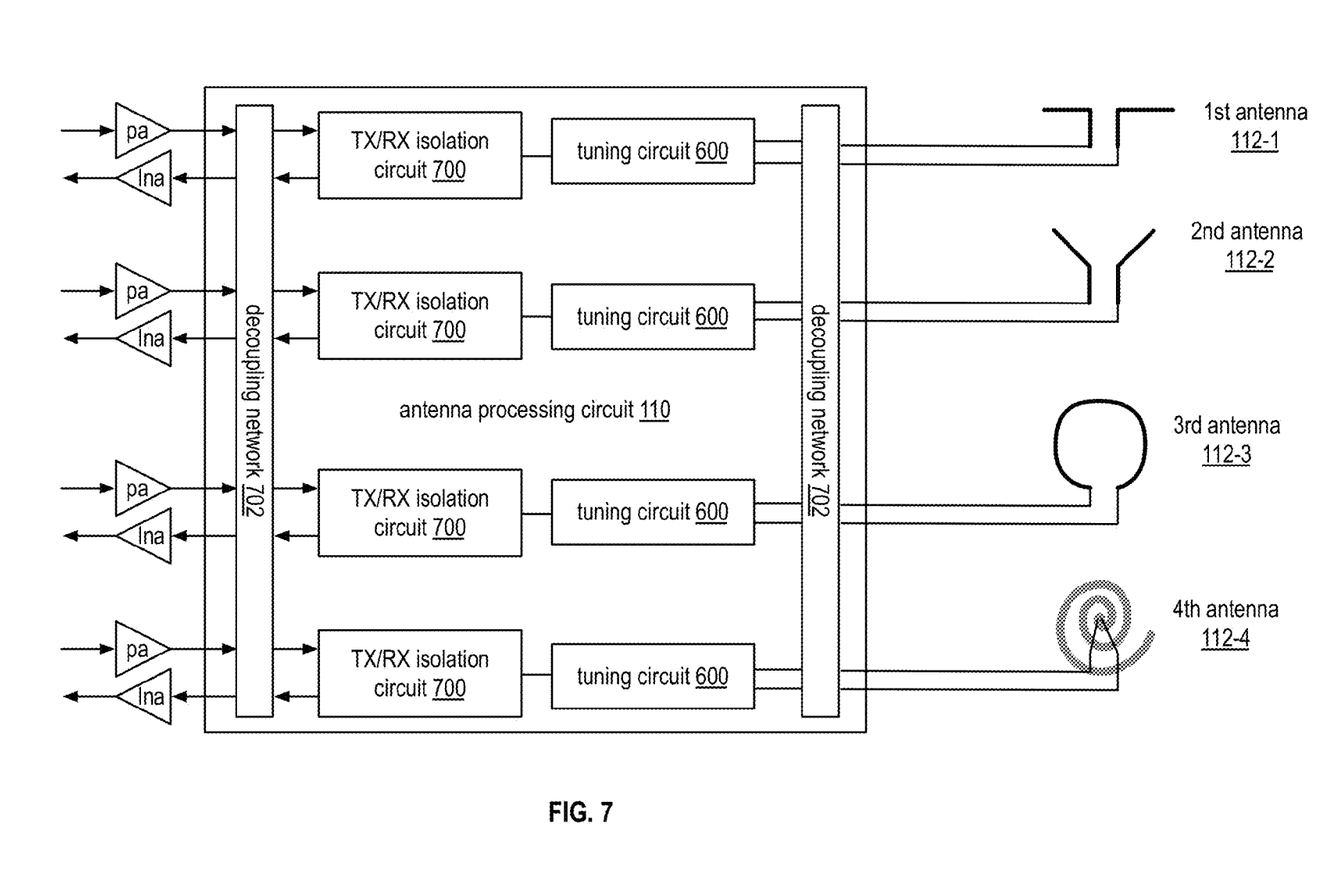
FIG. 7 is a schematic block diagram of another embodiment of an antenna processing circuit of a wireless communication device in accordance with the present disclosure.

FIG. 7 is a schematic block diagram of another embodiment of an antenna processing circuit 110 of a wireless communication device. The antenna processing circuit 110 includes one or more decoupling networks 702, tuning circuits 600, and transmit/receive (TX/RX) isolation circuits 700. The decoupling network circuit allows for each of the first antenna 112-1, second antenna 112-2, third antenna 112-3, and fourth antenna 112-4 to be coupled to any of the tuning circuits 600 and TX/RX isolation circuits 700. Note that the coupling of a tuning circuit 600 to a TX/RX isolation circuit 700 may be done via a direct coupling or via a decoupling network circuit.

In this example, the first antenna 112-1 is a dipole antenna with a 90° angle, the second antenna 112-2 is a dipole antenna with a 45° angle, the third antenna 112-3 is a circular antenna, and the fourth antenna 112-4 is a spiral antenna. The antenna tuning circuits 600 adjust the shape and/or direction of the antennas' radiation patterns to achieve a desired combined radiation pattern. Therefore, the antenna tuning circuit 600 adjusts the corresponding antenna's radiation pattern based on the specific physical properties of that antenna. The TX/RX isolation circuit 700 (which may be a duplexer, circulator, transformer, etc.) isolates (e.g., 20 dB or more) the transmit signal from the receive signal.

Figure 8A:
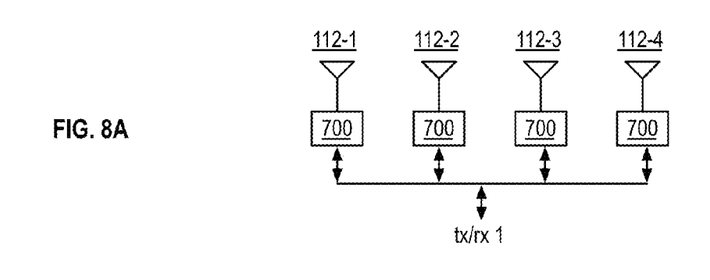
FIG. 8A is a block diagram of an embodiment of the antenna processing circuit of a wireless communication device coupled for diversity antenna operation in accordance with the present disclosure.
Figure 8B:
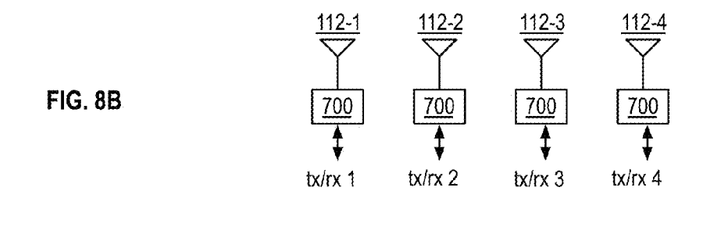
FIG. 8B is a block diagram of an embodiment of the antenna processing circuit of a wireless communication device coupled for multiple input multiple output (MIMO) operation in accordance with the present disclosure.
Figure 8C:
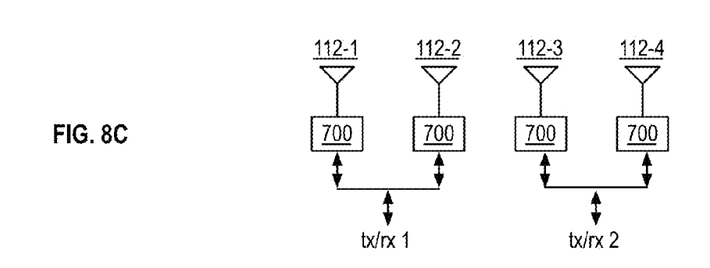
FIG. 8C is a block diagram of an embodiment of the antenna processing circuit of a wireless communication device coupled for both diversity antenna and multiple input multiple output (MIMO) operation in accordance with the present disclosure.

FIGS. 8A-8C are block diagrams of embodiments of multiple antenna processing circuits of a wireless communication device coupled for various modes of operation. FIG. 8A is a block diagram of an embodiment the antenna processing circuit coupling the antennas 112 for diversity antenna operation. For example, the antenna processing circuit 110 couples each of the antennas to its respective TX/RX isolation circuit 700 and couples the other end of the TX/RX isolation circuits 700 to transmit and receive a common communication (e.g., tx/rx 1). As such, the signal (tx/rx 1) is transmitted and received through the antennas 112-1-112-4 for power combining and/or antenna diversity operation. As is known, antenna diversity provides several observations of the same signal so if one antenna experiences a deep fade, usually another antenna has a sufficient signal. Accordingly, diversity antenna operation improves robustness and minimizes lost connections.

FIG. 8B is a block diagram of an embodiment of the antenna processing circuit 110 of a wireless communication device coupled for multiple input multiple output (MIMO) operation. In this example, each TX/RX isolation circuit 700 is fed a different tx/rx component of a 4×4 MIMO communication. For instances, the first antenna 112-1 is coupled for a first signal component (tx/rx 1), the second antenna 112-2 is coupled for a second signal component (tx/rx 2), the third antenna 112-3 is coupled for a third signal component (tx/rx 3), the fourth antenna 112-4 is coupled for a fourth signal component (tx/rx 4).

As an alternative to MIMO, the configuration of FIG. 8B may be used for separate communications. For example, signal tx/rx 1 is a WLAN communication while signal tx/rx 2 is cellular communication, and signal tx/rx 3 is a Bluetooth communication.

FIG. 8C is a block diagram of an embodiment of the antenna processing circuit 110 of a wireless communication device coupled for both diversity antenna/power combining and multiple input multiple output (MIMO) operation. In this example, a pair of antennas are fed a common signal component of a 2×2 MIMO communication. For instance, the first antenna 112-1 and the second antenna 112-2 are fed a first signal component (tx/rx 1) and the third antenna 112-3 and the fourth antenna 112-4 antennas are fed a second signal component (tx/rx 2). This operation combines the benefits of diversity operation and/or power combining with MIMO operation.

Figure 9:
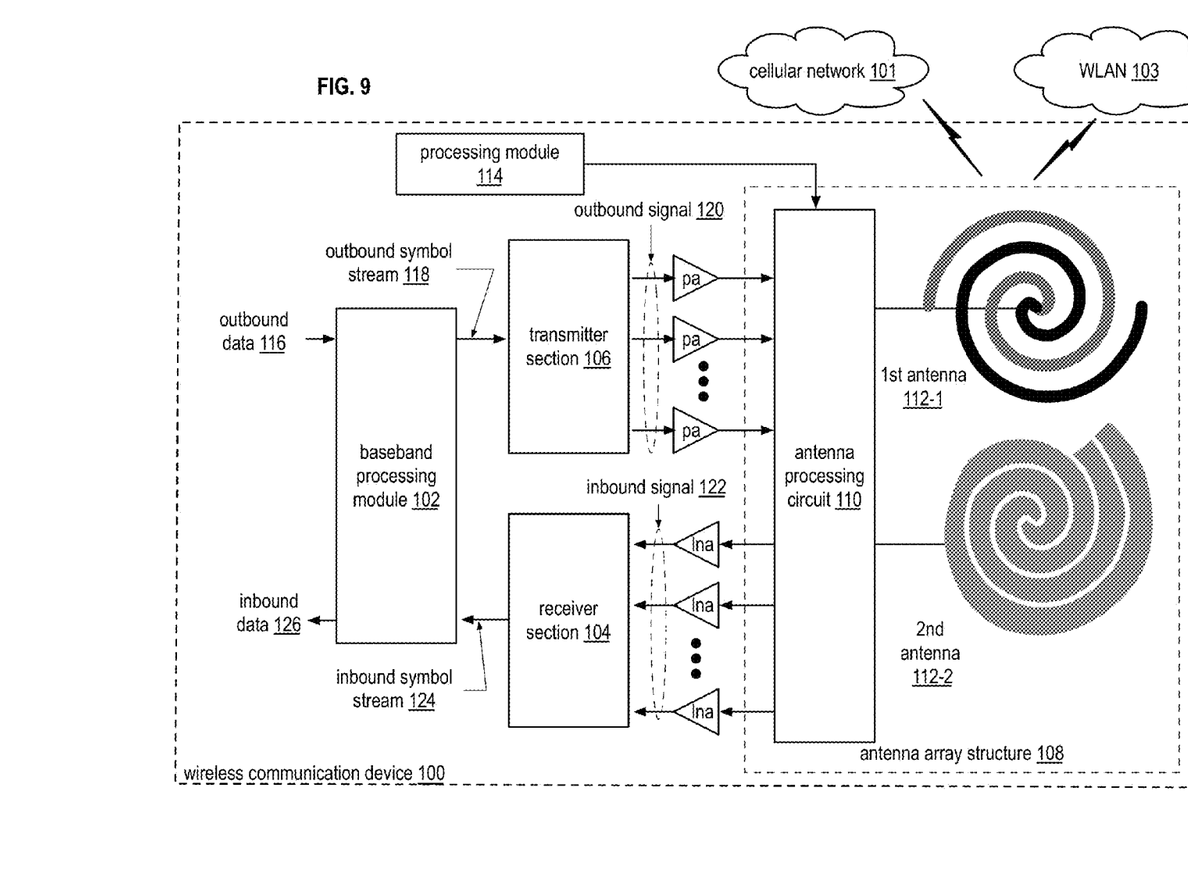
FIG. 9 is a schematic block diagram of another embodiment of a wireless communication device in accordance with the present disclosure.

FIG. 9 is a schematic block diagram of an embodiment of a wireless communication device 100 that includes a baseband processing module 102, a receiver section 104, a plurality of low noise amplifiers, a transmitter section 106, a plurality of power amplifiers, a processing module 114, and an antenna array structure 108. The antenna array structure 108 includes an antenna processing circuit 110, and one or more poly spiral antennas (e.g. a first poly spiral antenna 112-1 and a second poly spiral antenna 112-2). The first poly spiral antenna 112-1 has a first number of spirals to provide a first radiation pattern and a first frequency bandwidth. The second poly spiral antenna 112-2 has a second number of spirals to provide a second radiation pattern and a second frequency bandwidth. The first poly spiral antenna 112-1 may have a similar spiral shape but different number of turns than the second poly spiral antenna 112-2, or the first poly spiral antenna 112-1 could have a different spiral shape than the second poly spiral antenna 112-2. The differences in spiral shape and/or number of turns are to provide difference in radiation pattern while keeping the first and second frequency bandwidths overlapping.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. An antenna array structure comprising:
a plurality of antennas, wherein:
a first antenna of the plurality of antennas having a first geometric shape to provide a first radiation pattern and having a first frequency bandwidth;
a second antenna of the plurality of antennas having a second geometric shape to provide a second radiation pattern and having a second frequency bandwidth, wherein the first and second frequency bandwidths at least partially overlap and wherein one or more channels of interest are within the at least partially overlapping first and second frequency bandwidths;
a third antenna of the plurality of antennas having a third geometric shape to provide a third radiation pattern and having a third frequency bandwidth; and
a fourth antenna having a fourth geometric shape to provide a fourth radiation pattern and having a fourth frequency bandwidth, wherein the third and fourth frequency bandwidths at least partially overlap and wherein one or more of the channels of interest are within the at least partially overlapping third and fourth frequency bandwidths; and
an antenna processing circuit configured to:
send one or more transmit signals to one or more of the plurality of antennas for transmission via one or more of the channels of interest; and
receive one or more receive signals from the one or more of the plurality of antennas or from another one or more of the plurality of antennas via the one or more of the channels of interest or from another one or more of the channels of interest.

2. The antenna array structure of claim 1, wherein each of the first and second geometric shapes comprising one of:
line;
polygon;
circle;
ellipse;
hyperbola;
parabola;
spiral; or
eccentric spiral.

3. The antenna array structure of claim 1 further comprising:
one or more of the channels of interest are within a frequency band; and
resonant frequency of the first and second antennas is proximal to a center frequency of the frequency band.

4. The antenna array structure of claim 1, wherein the antenna processing circuit further comprising:
a first antenna tuning circuit configured to adjust at least one of:
shape of the first radiation pattern;
direction of the first radiation pattern; or
a second antenna tuning circuit configured to adjust at least one of:
shape of the second radiation pattern; or
direction of the second radiation pattern.

5. The antenna array structure of claim 1, wherein each of the third and fourth antennas comprising one of:
a different shape to the first or second antennas; or
a similar shape to the first or second antennas.

6. The antenna array structure of claim 1, wherein the antenna processing circuit further comprising at least one of:
coupling for multiple input multiple output (MIMO) operation;
coupling for diversity antenna operation; or
coupling for diversity antenna MIMO operation.

7. The antenna array structure of claim 1, wherein the first and second radiation patterns comprising one of:
linear polarization and a direction; or
circular polarization and the direction.

8. An antenna array structure comprising:
a first poly spiral antenna having a first number of spirals to provide a first radiation pattern and having a first frequency bandwidth;
a second poly spiral antenna having a second number of spirals to provide a second radiation pattern and having a second frequency bandwidth, wherein the first and second frequency bandwidths at least partially overlap and wherein channels of interest are within the at least partially overlapping first and second frequency bandwidths;
a third poly spiral antenna having a third number of spirals to provide a third radiation pattern and having a third frequency bandwidth; and
an antenna processing circuit configured to:
send one or more transmit signals to one or more of the first and second poly spiral antennas for transmission via one or more of the channels of interest; and
receive one or more receive signals from the one or more of the first, second and third poly spiral antennas.

9. The antenna array structure of claim 8 further comprising one of:
the first number of spirals having a similar spiral shape, but a different number of turns per spiral, as the second number of spirals; and
the first number of spirals having a different spiral shape than a spiral shape of the second number of spirals.

10. The antenna array structure of claim 8 further comprising:
a fourth poly spiral antenna having a fourth number of spirals to provide a fourth radiation pattern and having a fourth frequency bandwidth, wherein the third and fourth frequency bandwidths at least partially overlap and wherein additional channels of interest are within the at least partially overlapping third and fourth frequency bandwidths.

11. The antenna array structure of claim 8, wherein the antenna processing circuit further comprising:
a first antenna tuning circuit configured to excite different patterns of spirals to adjust at least one of:
shape of the first radiation pattern; or
direction of the first radiation pattern; and
a second antenna tuning circuit configured to excite different patterns of spirals to adjust at least one of:
shape of the second radiation pattern; or
direction of the second radiation pattern.

12. The antenna array structure of claim 11, wherein the antenna processing circuit further comprising:
a third antenna tuning circuit configured to excite different patterns of spirals to adjust at least one of:
shape of the third radiation pattern; or
direction of the third radiation pattern.

13. The antenna array structure of claim 8, wherein the antenna processing circuit further comprising at least one of:
coupling for multiple input multiple output (MIMO) operation;
coupling for diversity antenna operation; or
coupling for diversity antenna MIMO operation.

14. The antenna array structure of claim 8 further comprising:
the channels of interest are within a frequency band; and
resonant frequency of the first poly spiral antenna and the second poly spiral antenna is proximal to a center frequency of the frequency band.

15. A radio front-end circuit comprising:
a plurality of power amplifiers;
a plurality of low noise amplifiers;
an antenna array structure including:
a plurality of antennas, wherein:
a first antenna of the plurality of antennas having a first geometric shape to provide a first radiation pattern and having a first frequency bandwidth;
a second antenna of the plurality of antennas having a second geometric shape to provide a second radiation pattern and having a second frequency bandwidth, wherein the first and second frequency bandwidths at least partially overlap and wherein one or more channels of interest are within the at least partially overlapping first and second frequency bandwidths;
a third antenna of the plurality of antennas having a third geometric shape to provide a third radiation pattern and having a third frequency bandwidth;
a fourth antenna having a fourth geometric shape to provide a fourth radiation pattern and having a fourth frequency bandwidth, wherein the third and fourth frequency bandwidths at least partially overlap and wherein one or more of the channels of interest are within the at least partially overlapping third and fourth frequency bandwidths; and
an antenna processing circuit configured to:
receive one or more outbound signals from one or more of the plurality of power amplifiers;
send the one or more outbound signals to one or more of the plurality of antennas for transmission via one or more of the channels of interest;
receive one or more inbound signals from the one or more of the plurality of antennas or from another one or more of the plurality of antennas; and
send the one or more inbound signals to one or more of the plurality of low noise amplifiers.

16. The radio front-end circuit of claim 15, wherein the first and second geometric shapes comprising different ones of:
line;
polygon;
circle;
ellipse;
hyperbola;
parabola;

spiral; or eccentric spiral.

17. The radio front-end circuit of claim 15, wherein the antenna processing circuit further comprising:
- a first antenna tuning circuit configured to adjust at least one of:
  - shape of the first radiation pattern; or
  - direction of the first radiation pattern; and
- a second antenna tuning circuit configured to adjust at least one of:
  - shape of the second radiation pattern; or
  - direction of the second radiation pattern.

18. The radio front-end circuit of claim 15, wherein the third and fourth antennas comprising different ones of:
- a different shape to the first or second antennas; or
- a similar shape to the first or second antennas.

19. The radio front-end circuit of claim 15, wherein the antenna processing circuit comprising at least one of:
- coupling for multiple input multiple output (MIMO) operation;
- coupling for diversity antenna operation; or
- coupling for diversity antenna MIMO operation.

20. The radio front-end circuit of claim 15, wherein each of the first and second radiation patterns comprising one of:
- linear polarization and a direction; or
- circular polarization and the direction.

* * * * *